United States Patent [19]

Williams et al.

[11] Patent Number: 4,753,328

[45] Date of Patent: Jun. 28, 1988

[54] VEHICLE SUSPENSION SYSTEMS AND DAMPING ARRANGEMENTS THEREFOR

[75] Inventors: David A. Williams, Cranfield; Peter G. Wright, Norwich, both of England

[73] Assignee: Group Lotus PLC, Norwich, England

[21] Appl. No.: 827,809

[22] Filed: Feb. 10, 1986

[30] Foreign Application Priority Data

Feb. 8, 1985 [GB] United Kingdom ................. 8503290
Aug. 2, 1985 [GB] United Kingdom ................. 8519444

[51] Int. Cl.$^4$ .......................... F16F 9/46; B60T 8/18; B60G 17/00; B60G 11/26

[52] U.S. Cl. .................................. 188/299; 188/195; 267/64.16; 280/707; 280/708

[58] Field of Search ............... 267/64.13, 64.16, 64.17, 267/64.26, 11 A, 64.28, 124, 126, 186; 303/22 R, 22 A, 9.69; 188/266, 299, 195, 269, 300, 279, 281, 314, 318; 280/6.1, 707, 708, 714, DIG. 1, 6 H, 709; 180/41

[56] References Cited

U.S. PATENT DOCUMENTS

| | | | |
|---|---|---|---|
| 3,035,853 | 5/1962 | Klein | 280/DIG. 1 |
| 3,606,374 | 9/1971 | Capgras | 280/708 X |
| 3,736,000 | 5/1973 | Capgras | 267/64.16 X |
| 3,820,812 | 6/1974 | Stubbs et al. | 280/709 X |
| 4,270,771 | 6/1981 | Fujii | 280/707 |
| 4,333,668 | 6/1982 | Hendrickson et al. | 280/707 X |
| 4,445,672 | 5/1984 | Turiot | 267/64.16 |
| 4,506,751 | 3/1985 | Stephens | 280/707 X |
| 4,566,718 | 1/1986 | Kanai et al. | 280/708 |
| 4,639,013 | 1/1987 | Williams et al. | 267/64.16 |

FOREIGN PATENT DOCUMENTS

| | | | |
|---|---|---|---|
| 0112819 | 7/1983 | Japan | 188/299 |
| 2132273 | 7/1984 | United Kingdom | 188/314 |

Primary Examiner—Andres Kashnikow
Assistant Examiner—Robert J. Oberleitner
Attorney, Agent, or Firm—Young & Thompson

[57] ABSTRACT

A suspension system for a vehicle road wheel comprises a wheel suspension device (1) having a double-acting hydraulic actuator and a gas spring in parallel, the gas spring being controllable to provide a selectively variable offset, a sensor (6,90) arranged to sense load changes experienced by the suspension device and to provide an output dependent thereon, and control assembly (95) responsive to the sensor output to effect adjustment of the hydraulic actuator pending change of the offset of the gas spring to accommodate the load changes. Also disclosed is a damping system for damping movement of a piston (64) within a cylinder, the damping system comprising a valve (80) operable to connect spaces (70,74) within the cylinder at opposite sides of the piston to fluid pressure and/or return lines (84,85) so as to apply selected positive or negative damping to the movement of the piston. The damping system can be incorporated in the suspension system so that the piston (64) of the hydraulic actuator is damped, under control of signals from the control assembly (95) applied to the servo-valve (80).

16 Claims, 3 Drawing Sheets

VEHICLE SUSPENSION SYSTEMS AND DAMPING ARRANGEMENTS THEREFOR

FIELD OF THE INVENTION

The invention relates to vehicle suspension systems, in particular, to active vehicle suspension systems in which the position of a wheel relative to a vehicle is adjusted in response to sensed conditions, and to arrangements for damping piston movement which are applicable to such systems.

BACKGROUND OF THE INVENTION

In U.S. Pat. No. 4,625,993, the contents of which are incorporated herein by reference, there is described a vehicle suspension system comprising wheel suspension devices the displacement of which can be varied, and means responsive to the loading of the suspension devices to feed back to the devices electric signals effecting a predetermined displacement.

In U.S. patent application Ser. No. 747 130 filed on June 4 1985 also by the present inventors and also commonly owned herewith, and of which the contents are again incorporated herein by reference, there is disclosed a wheel suspension device capable of use in such a system and comprising an hydraulic actuator of which the piston position is adjustable in response to forces acting thereon and/or to a selected control input, and a load bearing strut responsive to the actuator piston experience to minimise the load carried by the actuator.

The system of U.S. Pat. No. 4,625,993 offers substantial advantages over previous passive suspension systems, but the full advantages of any such system are obtained only by the input of considerable energy.

It is accordingly an object of the present invention to provide an active vehicle suspension system with reduced energy demand under a wide range of conditions, for a given set of characteristics.

It is also an object of the invention to provide arrangements for the selective damping of the movement of a piston in a cylinder.

It is a further object of the invention to provide a vehicle suspension system including a hydraulic actuator and means for selectively damping movement of the actuator piston due to forces acting thereon.

It is moreover an object of the invention to provide a fluid-pressure actuator operatively associated with fluid pressure means controlled so as to exert a selected positive or negative damping effect on movement of the actuator piston.

SUMMARY OF THE INVENTION

The invention accordingly provides a vehicle suspension system comprising a wheel suspension device, the wheel suspension device having actuator means, gas spring means controllable to provide a selectively variable offset in parallel with the actuator means, and control means responsive to load changes experienced by the device to accommodate such changes by adjustment of the actuator means pending change of the offset of the gas spring. The arrangement is consequently such that adjustment of the actuator means has priority over, or is preferred to, that of the gas spring means.

The actuator means can comprise a double-acting hydraulic actuator connected to a source of pressure fluid through a servo-valve responsive to signals generated in response to the load experience of the device, in parallel with either a 2-port electrically controlled proportional valve or an asymmetrical flow restricting valve provided with blow-off valves, which could be included in the actuator piston.

The invention also provides a damping device for a piston movable in an hydraulic cylinder, the device comprising valve means selectively movable to communicate the cylinder interiors on opposite sides of the piston with pressure fluid supply and return lines to thereby exert a desired damping effect on movement of the piston.

Such damping arrangements can be incorporated in the vehicle suspension system of the invention, as by employing the servo-valve, in response to appropriate control signals, to communicate the two ends of the actuator with the pressure fluid supply and return lines.

Whether or not incorporated in any kind of vehicle suspension system, the damping arrangements of the invention permit the movement of a piston to be damped by fluid pressure either positively or negatively, and to a selected degree.

The gas spring of the suspension system can comprise a selectively variable volume of fluid in the device either in contact with a body of gas also within the device or associated with an external hydraulic accumulator. The volume of the fluid body is adjustable by means of a 3-port valve which arranged to respond to the pressure difference across the actuator piston, sensed either electrically or hydraulically or to the load experienced by the device.

Under the steady loads, that is, when the mean pressure across the actuator piston is zero, the damping of the device is primarily controlled by the valve in parallel with the servo-valve, for example, the 2-port valve mentioned, either passively, or if the valve is electrically controlled, adaptively, the valve being controlled to effect any change in damping characteristics called for externally of the device.

Sudden changes in the steady load carried by the device, for example, a payload change or an inertial load change, are controlled by adjustment of the actuator, as by way of the solenoid valve, until the gas spring offset had been changed, as through the 3-port valve.

However embodied, the invention provides that the energy consumption of the system is a function only of the active component of the dynamic movement of the device and the flow through the actuator valving arrangement caused by the pressure difference across the actuator piston, whilst the gas spring offset is being adjusted to bring this pressure difference to zero. Substantial reduction in energy demand is achieved over the demand in conventional systems which the demand is a function of the total motion of the suspension devices.

Figure 1A:
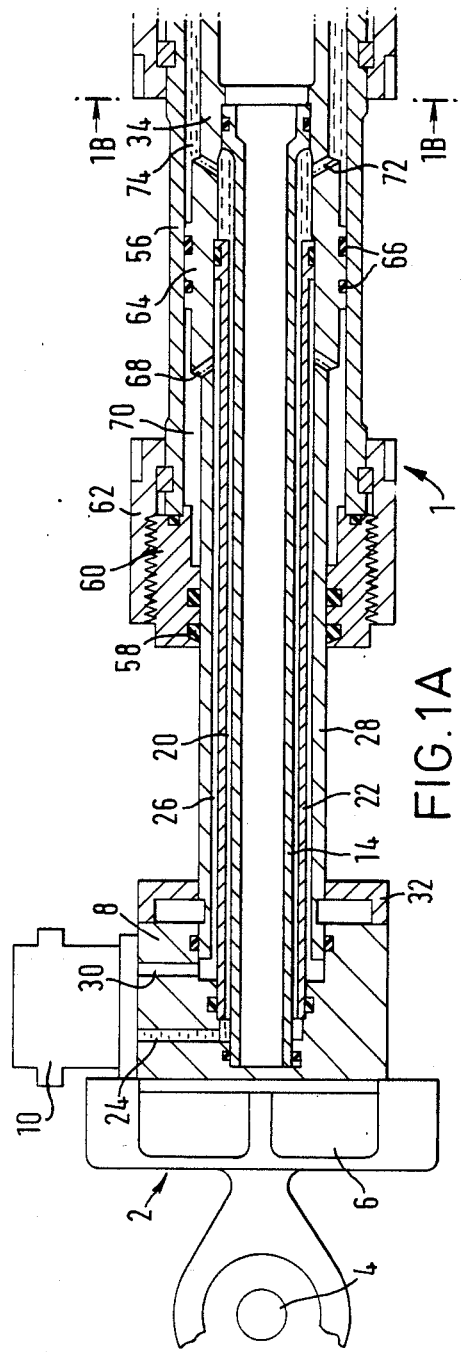
FIG. 1A and 1B together are a sectional front view of a vehicle wheel suspension device for use in vehicle suspension systems embodying the invention, shown in an extended position.
Figure 1B:
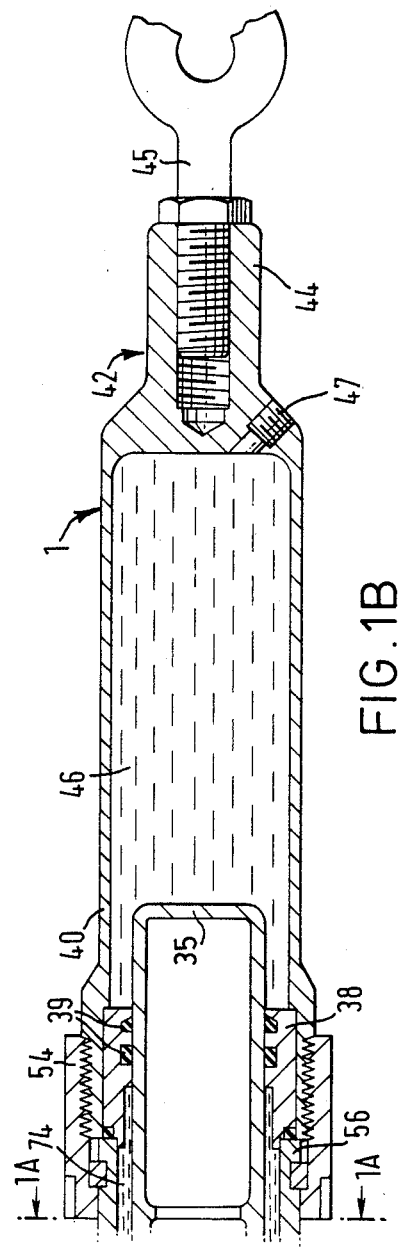
Figure 2:
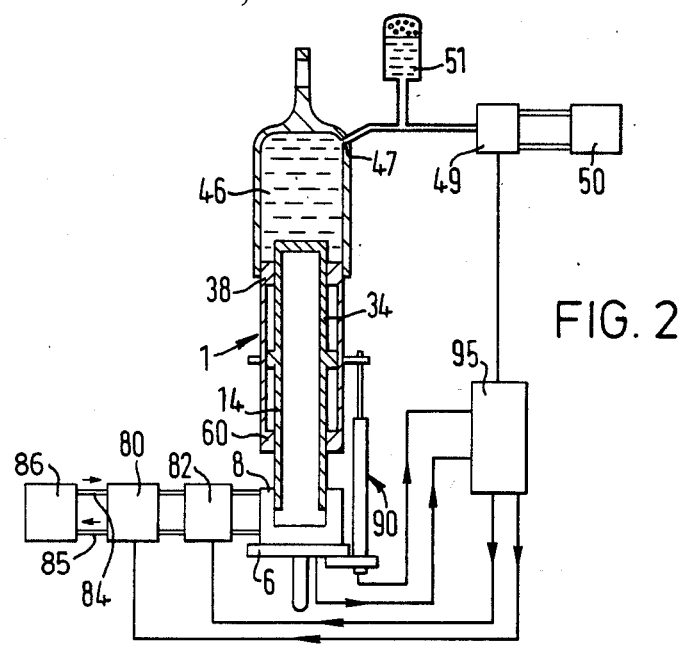
FIG. 2 schematically shows the suspension device of FIG. 1 incorporated in a first vehicle wheel suspension system in accordance with the invention.

The vehicle wheel suspension device 1 illustrated in FIGS. 1 and 2 comprises a lower end fitting 2 formed with a loop 4 for connection of the device to a vehicle axle assembly (not shown).

At its upper side, the fitting 2 has a recess accommodating a load cell 6 operative between the fitting and a head member 8. The head member 8 has a stepped recess formed in its upper side within which are received three concentric tubes 14,22,28, each sealed to the head member by an external O-ring or like seal. The tube 22 is spaced from the tubes 14 and 28 to define respective intermediate spaces 20 and 26. The assembly comprising the tubes 14,22,28 is secured to the head member 8 by means of a steel split collar 32. At its upper end, the inner tube 14 is sealingly secured to an extension portion 34 of the outer tube 28, the upper end of which is closed at 35.

A ring 38 makes a sliding seal to the exterior of the extension portion 34 by means of sealing rings 39. An upper end fitting 42 has a lower tubular end portion 40 secured to the ring 38. The fitting 42 is closed by a reduced diameter portion 44 at its upper end, the portion being tapped to receive a threaded end element 45 for connection of the device 1 to a vehicle chassis.

An outer ring 54 is secured around the lower end of the end portion 40 by means of a screw threaded connection. Secured within the lower end of the ring 54 is a sleeve 56, the upper end of which abuts the end portion 40 and the ring 38. The sleeve 56 is thus a downward extension of the end fitting 42 and at its lower end it makes a sliding seal on the exterior of the outer tube 28 by means of sealing elements 58 held by an end ring 60 secured to the sleeve end by an outer ring 62. The outer tube 28 has, below the extension tube 34, a larger diameter portion 64, which makes a sliding seal, with the sleeve 56 by means of sealing elements 66, and which functions as a piston.

The space 20 between the inner tube 14 and the intermediate tube 22 communicates through a passage 24 in the head member 8 with valve means described with reference to FIGS. 2-6, and the outer annular space 26 between the intermediate tube and the stainless steel outer tube 28 communicates with the valve means through a passage 30 in the head member. Ports 68 at the lower end of the piston portion 64 communicate the space 26, between the tubes 22 and 28, with the space 70 between the tube 28 and the sleeve 56. Also, ports 72 at the upper end of the portion 64 communicates the space 20 between the tubes 14 and 22 with the space 74 between the extension tube 34 and the sleeve 56.

The device 1 can thus function as a double acting hydraulic actuator. Pressure fluid introduced into the space 70 from a suitable pressure fluid source, by way of the valve means, passage 30, annular space 26 and ports 68, will act on the end faces of the space 70 to shorten the device. Pressure fluid supplied to the space 74 through the valve means, passage 24, annular space 20 and ports 72 will act within the space 74 to lengthen the device.

Also, the interior of the end fitting 42 forms a working chamber 46 to which fluid can be supplied under pressure through a port 47. The volume of the body of hydraulic fluid in the working chamber 46 can thus be selectively adjusted to alter the load deflection characteristics of the device 1.

The condition of the device 1 is sensed not only by the load cell 6 but also by a linear variable displacement transformer 90, of which the stator portion is received in a housing secured to the fitting 2 and to the head member 8, whilst the movable core or yoke portion is secured to the sleeve 56. The output of the transformer 90 is thus dependent on the length, and variations in the length, of the device 1, as represented by the position and movement of the piston portion 64 in the sleeve 56. The transformer 90 thus supplies signals indicative of at least one of the velocity, acceleration and position of the piston portion 64.

In FIG. 2, the port 47 of the working chamber 46 is connected through a 3-port valve 49 with a fluid pressure source 50 by way of an hydraulic accumulator 51. FIG. 2 also schematically shows valve means communicating with the passages 24 and 30 in the head member 8. The valve means comprise a servo-valve 80 communicating with a hydraulic fluid pressure source 85 which can, but need not be, a source separate from the source 50, by way of pressure fluid supply and return lines 84 and 85. The servo-valve 80 is connected with a 2-port electrically controlled proportional valve 82, the proportional valve in turn communicating with the head member passages 24 and 30.

The outputs of the load cell 6 and of the linear variable displacement transformer 90 are supplied to control circuitry 95 arranged to generate control signals which are supplied to the valves 49,80 and 82. The control circuitry 95 is generally of the kind described in the above referenced U.S. Pat. No. 4,625,993. However, the control circuitry and also the characteristics of the valves of the present system are so selected and arranged that during a steady load condition, in which the mean pressure differences across the piston portion 64 is zero, the damping of the device 1 is controlled primarily by the 2-port valve 82. This control may be passive or adaptive, as by being proportional to the electrical control signal supplied by the control circuitry 95.

The circuitry 95 is arranged to supply to the 3-port valve 49 control signals dependent on the load experienced by the device 1, or the pressure difference across the piston portion 64. Sudden changes in the load experienced by the device 1, which may be due to a change in the payload of the vehicle in which the system is incorporated and/or to inertia loads on accelerating or cornering, are accommodated by the servo-valve 80 until such time as the valve 49 responds to the control signals to adjust the volume of pressure fluid in the chamber 46 to alter the offset of the gas spring constituted by this chamber and the hydraulic accumulator 51.

Figure 3:
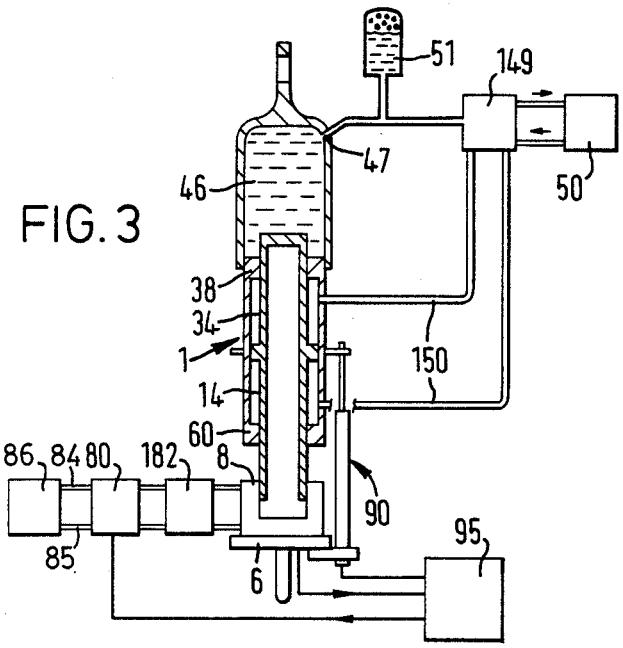
FIG. 3 schematically shows the suspension device of FIG. 1 incorporated in a second vehicle wheel suspension system in accordance with the invention.

In the second system of the invention shown in FIG. 3, parts similar to those of the system shown in FIG. 2 are indicated by the same reference numerals. The second system differs from the first in respect of two modifications, either of which could be made to the first system independently.

Firstly, the electrically controlled 3-port valve 49 is replaced by a 3-port valve 149 controlled hydraulically in response to the pressure difference across the piston portion 64, conveyed to the valve through pipe connections 150.

Secondly, the 2-port electrically controlled valve 82 is replaced by an asymmetrical flow restrictive valve 182 fitted with blow off valves. The blow-off valves could instead be incorporated into the piston portion 64 itself. The characteristics of this valving arrangement are similar to those of damping valves in a shock absorber.

The system of FIG. 3 is arranged to respond to steady and changing load conditions in substantially the same way as that of FIG. 2 adjustment of the position of the piston portion 64 being preferred to, or given priority over, adjustment of the volume of pressure fluid in the chamber 46.

In these and other systems in accordance with the invention, if it is desired to obtain damping characteristics requiring an energy input to the system, the control circuitry 95 is arranged to supply to the servo-valve 80 a signal to effect acceleration or deceleration, as required, of the actuator operation.

Figure 4:
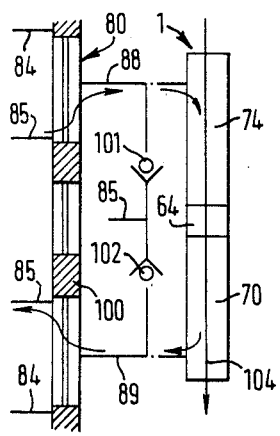
FIGS. 4, 5 and 6 schematically show how a servo-valve included in the system can be operated to achieve desired characteristics.
Figure 5:
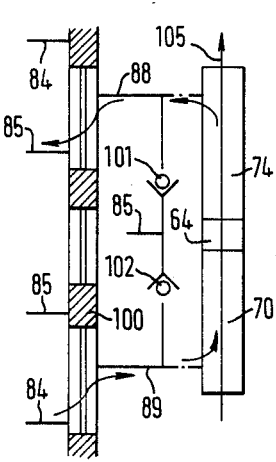
Figure 6:
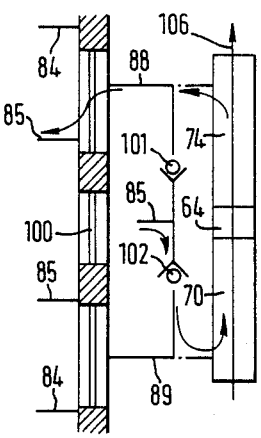

Thus, FIGS. 4, 5 and 6 schematically show the servo-valve 80 as comprising a spool member 100 having four valve spools co-operable with ports communicating with the pressure and return lines 84 and 85 and with fluid lines 88 and 89 extending to the valve 82, and thus to the spaces 70 and 74 of the actuator portion of the device 1. The lines 88 and 89 communicate with the return line 85 through respective non-return valves 101,102.

In FIG. 4, the position of the servo-valve spool member 100 is such as to communicate both of lines 88 and 89 with the return line 85. Communication between the pressure line 84 and lines 88 and 89 is blocked. The piston portion 64 is moving downwardly as indicated by arrow 104, so fluid flows from the return line 85 into the space 74 and to it from the space 70. Because fluid movement is to and from the return line only, the piston portion 64 is substantially decelerated or highly damped.

In the position of the spool member 100 shown in FIG. 5, the piston portion 64, which is moving upwardly, is accelerated, that is, it is negatively damped. This occurs because the position of the valve spools is such as to communicate the pressure line 84 with the line 89, so that the fluid pressure acts in the space 70 in the direction of movement of the piston portion. The space 74 communicates through the line 88 with the return line 85 for escape of the fluid displaced by the piston portion movement.

In FIG. 6, the servo-valve spool member 100 occupies a position in which neither the pressure line 84 nor the return line 85 communicate with the line 89. The line 88 communicates with the return line 85. The piston portion 64 is moving upwardly as indicated by arrow 106 and fluid is readily expelled from the space 74 through the line 88. The corresponding volume of fluid is drawn into the space 70 but only through the non-return valve 102 which communicates the return line 85 with the line 89. The piston portion 64 is therefore damped, but to a lower degree than when fluid is drawn directly from the return line 85 as in the situation shown in FIG. 4.

Thus it will be seen that by appropriate positioning of the spool member 100 under control of the control circuitry 95, damping and negative damping in desired degrees can be applied to the movement of the piston portion 64 in either direction.

Figure 7:
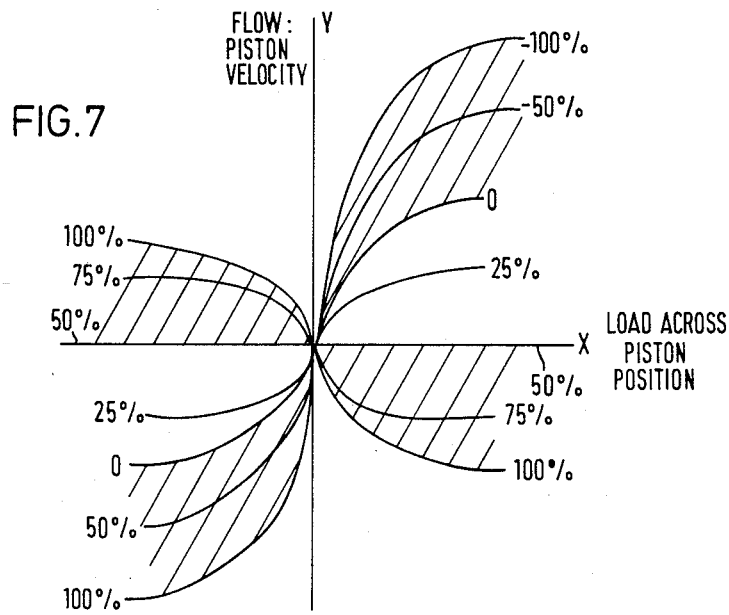
FIG. 7 graphically displays the relationship of the velocity of the piston of an actuator included in the system to the load across the piston.

In FIG. 7, the characteristics of the combination of the hydraulic actuator portion of the device 1 and the servo-valve 80 are graphically represented. The velocity of the piston portion 64 is plotted along the Y-axis against the load across the piston on the X-axis for various percentages of the rated current, the "consumed flow" being indicated by the shaded area.

Although primarily intended for use in road vehicles, it will be evident that the applications of suspension systems embodying the invention are not so limited. It will be evident also that the selectively controlled damping arrangements described with reference to FIGS. 4–7 can be applied not only to the damping of piston movement in other vehicle suspension systems but to the damping of piston movement generally, regardless of the apparatus of which the piston forms a part.

It is evident that those skilled in the art may make numerous modifications of the specific embodiment described above without departing from the present inventive concepts. It is accordingly intended that the invention shall be construed as embracing each and every novel feature and novel combination of features present in or possessed by the apparatus herein described and that the foregoing disclosure shall be read as illustrative and not as limiting except to the extent set forth in the claims appended hereto.

We claim:

1. A vehicle suspension system comprising:
   a wheel suspension device comprising a double-acting hydraulic actuator, and a selectively variable offset gas spring in parallel with said hydraulic actuator,
   first adjustment means operable to adjust the length of said hydraulic actuator,
   second adjustment means operable to adjust the offset of said gas spring,
   control means responsive to load changes experienced by said suspension device to generate signals for operating said first and second adjustment means whereby adjustment of said actuator occurs before adjustment of said gas spring offset, and
   damping control means included in said first adjustment means and adapted to apply a selected one of at least two degrees of damping to said actuator movement.

2. The vehicle suspension system of claim 1 wherein said damping control means is adapted to effect a selected one of positive and negative damping of said actuator movement.

3. The vehicle suspension system of claim 1 wherein said damping control means is adapted to effect a selected one of high and lower positive damping of said actuator movement.

4. The vehicle suspension system of claim 1 wherein said damping control means is adapted to effect a selected one of negative damping and high and lower positive damping of said actuator movement.

5. The suspension system of claim 1 wherein said variable offset gas spring comprises a body of gas, a body of liquid in contact with said body of gas, and said second adjustment means comprises means for adjustment of the volume of said liquid body.

6. The suspension system of claim 5 wherein said second adjustment means comprises a source of liquid pressure, a pressure line communicating said pressure source with said liquid body, and a control valve in said pressure line.

7. The suspension system of claim 6 wherein said control valve comprises a three-port valve responsive to electric signals.

8. The suspension system of claim 6 wherein said control valve comprises a three-port valve responsive to hydraulic signals.

9. The suspension system of claim 1 wherein said hydraulic actuator comprises a cylinder and a piston movable in said cylinder, and wherein said first adjustment means comprises fluid pressure supply and return lines, two fluid lines communicating with said cylinder at respective opposed sides of said piston, a servo-valve for selectively communicating said supply and return lines with said fluid lines, and non-return valves each connecting a respective one of said fluid lines to said return line, said servo-valve having a first position communicating both of said fluid lines with said return line, to thereby effect positive damping of said piston movement, a second position in which one of said fluid lines communicates with said return line through said servo-valve and the other of said fluid lines communicates with said fluid pressure return line through the one of said non-return valves connected to the fluid line, and a third position in which one of said fluid lines communicates with said supply line and the other of said fluid line communicates with said return line.

10. A hydraulic device comprising:
a cylinder,
a piston movable within said cylinder in response to external forces, said piston dividing said cylinder interior into two chambers,
hydraulic fluid pressure and return lines,
a damping control valve operative between said hydraulic fluid pressure and return lines and said cylinder chambers to control communication of said fluid pressure and return lines with said cylinder chambers,
two fluid lines extending between said damping control valve and respective ones of said cylinder chambers, and
non-return valves each permitting communication of said return line with a respective one of said fluid lines,
said damping control valve being selectively movable between a first position in which fluid pressure is applied to accelerate movement of said piston, a second position in which both said cylinder chambers communicate with said return line through said damping control valve whereby said piston movement is damped to a first degree, and a third position in which one of said cylinder chambers communicates with said return line through said damping control valve and the return line communicates with the other of said cylinder chambers through the non-return valve associated therewith, whereby said piston movement is damped to a second lower degree.

11. A vehicle suspension system comprising: fluid pressure and return lines,
a wheel suspension unit incorporating a double-acting hydraulic actuator, said actuator having a cylinder and a piston movable in said cylinder and dividing said cylinder into two chambers,
two non-return valves each permitting communication of said return line with a respective one of said cylinder chambers,
damping control valve means,
means communicating both said cylinder chambers with said return line through said damping control valve means,
said damping control valve means being movable to control communication between said pressure and return lines and said cylinder chambers so as to apply a selected one of negative damping and higher and lower positive damping of said movement of said piston, wherein one of said cylinder chambers communicates with said return line through said valve means when said higher positive damping is applied to said piston movement and the return line communicates with the other of said cylinder chambers through the non-return valve associated therewith, when said lower positive damping is applied to said piston movement,
sensing means providing an output signal responsive to the load experience of said actuator, and
control means responsive to said output signal to effect said movement of said damping control valve means.

12. A vehicle suspension system comprising:
fluid pressure and return lines,
a wheel suspension unit comprising a double-acting hydraulic actuator and a variable offset gas spring in parallel with sid hydraulic actuator, sid hydraulic actuator having a cylinder and a piston movable in said cylinder and dividing said cylinder into two chambers,
damping control valve means movable to control communication between said pressure and return lines and said cylinder chambers so as to apply a selected one of higher and lower positive damping of said movement of said piston, and negative damping thereof,
sensing means providing an output signal responsive to the load experience of said actuator,
control means responsive to said output signal to effect said movement of said damping control valve means, and
adjustment means operable by said control means to effect adjustment of said gas spring offset, said control means being adapted to effect damping control of said hydraulic actuator before effecting said adjustment of said gas spring offset.

13. A hydraulic device comprising:
a cylinder having a piston movable in the interior thereof and dividing said interior into two cylinder chambers,
a control valve having an interior and spool means movable in said interior and dividing said interior into two valve chambers,
two fluid lines, each fluid line communicating a respective cylinder chamber with a respective valve chamber,
hydraulic fluid pressure and return lines,
means communicating each of said pressure and return lines with each of said valve chambers,
said spool means being movable between a first position in which said cylinder chambers communicate respectively with said pressure line and said return line to effect negative damping of said movement of said piston, and a second position in which both said cylinder chambers communicate with said fluid return line, whereby said movement of said piston is positively damped.

14. The hydraulic device of claim 13 further comprising two non-return valves, each non-return valve permitting communication of said return line with a respective one of said cylinder chambers, and wherein each spool means has a third position in which one of said cylinder chambers communicates with said return line by way of the valve chamber in communication therewith and the other of said cylinder chambers communicates with said return line only by way of said non-return valve permitting said communication, whereby said movement of said piston is positively damped to a lower degree than in the second position of said spool means.

15. A hydraulic device comprising:
   a cylinder having a piston movable in the interior thereof and dividing said interior into two cylinder chambers,
   a control valve having an interior and spool means movable in said interior and dividing said interior into two valve chambers,
   two fluid lines, each fluid line communicating a respective cylinder chamber with a respective valve chamber,
   hydraulic fluid pressure and return lines, means communicating each of said pressure and return lines to each of said valve chambers,
   two non-return valves, each non-return valve permitting communication of said return line with a respective one of said cylinder chambers,
   said spool means being movable between a first position in which one of said cylinder chambers communicates with said return line through the valve chamber in communication therewith, and the other cylinder chamber communicates with said return line only through said one of said non-return valves permitting such communicating, whereby said piston movement is damped to a first degree, and a second position wherein each of said cylinder chambers communicates with said return line through said valve chamber in communication therewith, whereby said valve movement is damped to a second greater degree.

16. The hydraulic system of claim 15 wherein said valve spool is capable of movement to a third position in which one of said cylinder chambers is connected to said return line through said valve chamber and communication therewith and the other cylinder chamber is in communication with said pressure supply line through said other valve chamber, whereby said piston movement is negatively damped.

* * * * *